(12) United States Patent
Quigley (10) Patent No.: US 12,404,923 B2
(45) Date of Patent: Sep. 2, 2025

(54) UNIVERSAL TRANSFER CASE FOR RIGHT SIDE OR LEFT SIDE INSTALLATION

(71) Applicant: QUIGLEY MOTOR COMPANY, INC., Manchester, PA (US)

(72) Inventor: Todd Cameron Quigley, York, PA (US)

(73) Assignee: Quigley Motor Company, Inc., Manchester, PA (US)

( * ) Notice: Subject to any disclaimer, the term of this patent is extended or adjusted under 35 U.S.C. 154(b) by 0 days.

(21) Appl. No.: 18/591,784

(22) Filed: Feb. 29, 2024

(65) Prior Publication Data

US 2024/0294066 A1    Sep. 5, 2024

Related U.S. Application Data

(60) Provisional application No. 63/488,191, filed on Mar. 3, 2023.

(51) Int. Cl.
| | |
|---|---|
| *F16H 57/037* | (2012.01) |
| *B60B 35/16* | (2006.01) |
| *B60K 17/16* | (2006.01) |
| *B60K 17/344* | (2006.01) |
| *B62D 65/10* | (2006.01) |
| *F16H 48/42* | (2012.01) |

(Continued)

(52) U.S. Cl.
CPC ........... *F16H 57/037* (2013.01); *B60B 35/16* (2013.01); *B60K 17/165* (2013.01); *B60K 17/344* (2013.01); *B62D 65/10* (2013.01); *F16H 48/42* (2013.01); *F16H 57/021* (2013.01); *B60B 2320/10* (2013.01); *B60B 2900/116* (2013.01); *B60B 2900/351* (2013.01); *F16H 2057/02052* (2013.01)

(58) Field of Classification Search
CPC ...... F16H 57/037; F16H 57/021; F16H 48/42; F16H 2057/02052; B60B 35/16; B60B 2320/10; B60B 2900/116; B60B 2900/351; B60K 17/165; B60K 17/344; B62D 65/10

See application file for complete search history.

(56) References Cited

U.S. PATENT DOCUMENTS 3,145,582 A * 8/1964 Wagner ................ F16H 57/027
                                                     74/606 R
4,020,715 A * 5/1977 Sollars ................. F16H 57/031
                                                     74/606 R (Continued)

OTHER PUBLICATIONS

Amazon listing, NP261XHD transfer case, Date first available Feb. 28, 2019 (Year: 2019).*

Primary Examiner — Thomas C Diaz
(74) Attorney, Agent, or Firm — Saxton & Stump, LLC (57) ABSTRACT

A universal transfer case for a vehicle having a casing with a primary drive axis and a secondary drive axis spaced apart and parallel to the primary axis. The casing includes a connector configured to permit coupling to a vehicle in a manner locating the secondary drive axis in one of a plurality of orientations in relation to the primary drive axis thereby allowing the transfer case to be used with front axle drives offset to the right or left of the primary powertrain axis. Interface connection locations may be provided in the casing which when machined allow openings in and/or connections to the casing to be optimally positioned based on the installation orientation.

5 Claims, 6 Drawing Sheets

(51) Int. Cl.
*F16H 57/021* (2012.01)
*F16H 57/02* (2012.01)

(56) References Cited

U.S. PATENT DOCUMENTS

| | | | | |
|---|---|---|---|---|
| 4,641,547 | A | * | 2/1987 | Stich .................... F16H 57/025 |
| | | | | 74/606 R |
| 4,744,436 | A | * | 5/1988 | Uchiyama .............. B60K 17/34 |
| | | | | 464/178 |
| 5,116,293 | A | * | 5/1992 | Reuter .................... F16D 3/223 |
| | | | | 475/222 |
| 6,155,126 | A | * | 12/2000 | Vogt ........................ F16H 61/32 |
| | | | | 74/335 |
| 10,415,687 | B1 | * | 9/2019 | Hemry ................ G01M 13/021 |
| 2015/0159751 | A1 | * | 6/2015 | Pritchard ........... B60K 23/0808 |
| | | | | 29/893.1 |

* cited by examiner

UNIVERSAL TRANSFER CASE FOR RIGHT SIDE OR LEFT SIDE INSTALLATION

CROSS REFERENCE TO RELATED APPLICATIONS

This application claims priority benefit to provisional patent application No. 63/488,191 filed on Mar. 3, 2023, the entirety of which is incorporated by reference herein.

FIELD OF THE INVENTION

The present disclosure relates generally to vehicular drivetrains and, more particularly, to a transfer case for four-wheel drive vehicles adaptable for multiple driveline arrangements.

BACKGROUND OF THE INVENTION

Four-wheel drive systems for vehicles in which power trains are longitudinally arranged generally requires that the drive shaft for one of the axles be laterally offset from the main engine/driveline axis. Drive lines for the front axles are most commonly laterally offset allowing the rear axle driveline to be arranged on the vehicle's longitudinal centerline and in line with the powertrain centerline. Front driveline offset is typically accomplished in a transfer case which offsets the front drive shaft take-off and provides a rear drive shaft take-off aligned on the main power drive line.

Drivetrain components in high-volume production runs (e.g., OEM applications) may be designed from the outset for a specific drive side configuration. Such OEM designs warrant drivetrain components specifically designed for right-side or left-side front axle drive shaft locations. Demands for continual improvements in production efficiency as well as after-market applications, make apparent the need to greater installation flexibility and adaptability, especially as more vehicle manufacturers turn to second-tier suppliers for components, including transmissions, axles, and other drivetrain components.

Such adaptability in drivetrain components does not currently exist in the automotive industry. Transfer cases and axles for longitudinal driveline four-wheel drive systems are specifically designed to laterally offset front axle drive shafts on only one side. Therefore, it would be desirable to have a universal powertrain component, such as the transfer case and/or axle, that can be easily adapted for use in a vehicle regardless of the required front driveline offset. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The concept and physical design of a universal drive train component, whether a transfer case or axle, will lend itself to a more streamlined timeframe during the engineering and design process. It also lends to a more efficient manufacturing process as well as reducing expenses and the amount of time from concept to market.

In an embodiment, a universal transfer case includes a casing, a primary driveline axis, a secondary driveline axis parallel to and spaced apart from the primary axis, and a connector for coupling the casing to a vehicle and aligning the secondary axis in one of a plurality of orientations relative to the primary axis. The plurality of orientations allows the secondary driveline to be positioned in at least to the vehicle left of the primary driveline axis and to the vehicle right of the primary drive line axis.

In an embodiment, a universal transfer case includes casing with a mechanical connector, the connector having a plurality of connectors arranged symmetrically about a primary driveline axis to couple the transfer case to the vehicle. The connectors are regularly positioned in a manner allowing the casing to be rotationally clocked about the primary driveline axis. The connector arrangement allows the secondary driveline to be positioned to the vehicle left or vehicle right of the primary driveline axis as well as vertically below or above the primary drive line axis. Secondary driveline axis locations that are laterally offset to the right or left of the primary driveline axis and vertically offset below the primary driveline axis are preferred.

In an embodiment, a universal transfer case includes a casing having a plurality of interface locations positioned on the casing. One or more of the interface locations may be made functional by a machining operation, the specific location being selected based upon the orientation of the transfer case in the vehicle. Interface location functionality may include a machining operation to create an opening in the casing wall or a threaded blind hole to allow connection of an externally mounted component in the location best suited for the installed transfer case orientation.

In an embodiment, a method of installing a universal transfer case into a vehicle includes identifying a first drive axis in relation to the first axle, identifying a second drive axis in relation to the second axle and determining an offset of the second drive axis from the first drive axis. A universal drivetrain component having a casing, a primary drive axis, a secondary drive axis, and a connector for coupling the casing to the vehicle to position the secondary drive axis in one of a plurality of orientations in relation to the primary drive axis is provided. The universal drivetrain component is oriented to position the secondary drive axis proximate to the second drive axis and then connected to the vehicle.

In an embodiment, a method of installing a universal transfer case into a vehicle includes providing a plurality of interface locations on the casing, identifying the interface location(s) best positioned based on the planned installed orientation of the transfer case in the vehicle, and making the selected interface location(s) made functional by a machining operation. Interface location functionality may include a machining operation to create an opening in the casing wall or a threaded blind hole to allow connection of an externally mounted component in the location best suited for the installed transfer case orientation.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

The advantages of this invention will be apparent upon consideration of the following detailed disclosure of the invention, especially when taken in conjunction with the accompanying drawings wherein.

Wherever possible, the same reference numbers will be used throughout the drawings to represent the same parts.

DETAILED DESCRIPTION OF THE INVENTION

Transfer cases and axles are either a left-side installation or a right-side installation, based off the centerline of an Original Equipment (OE) manufacturer's powertrain centerline. Transfer cases and axles according to the present disclosure have a design that may be mounted or installed on either side of the OE's powertrain centerline. In one embodiment, both a transfer case and an axle having the universal configuration are configured to permit the installation on an OE's powertrain. To provide the universal configuration, the component should have a raw casting configured to permit multiple unique connection features to be machined while still maintaining the correct alignment of the connection features with the other drivetrain components. The casing interior must be configured to assure proper distribution of lubrication to internal rotation components regardless of the installed orientation. Once the castings are engineered to be universal in nature, the second phase is to engineer the machining of the casting to adapt it to one of a plurality of installation orientations. The machining step transforms the universal casting into one specific to a right-side or a left-side driveline installation.

The transfer case and the axle, whether they are machined for a left-side or right-side installation, still have the same internal components. The final transfer case and axle products are universal in relation to how they can be installed/mounted simply based on how the raw casting is achieved. This flexibility allows the transfer case to be easily configured for a left-side or right-side installation/mounting.

Figure 1:
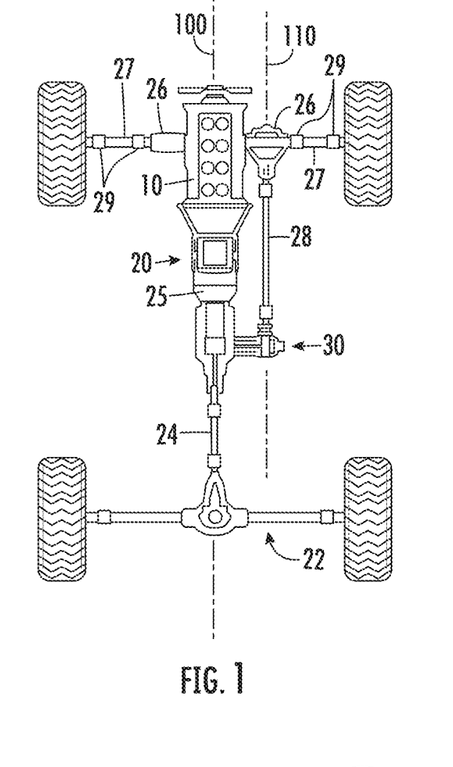
FIG. 1 illustrates a drivetrain layout in a four-wheel drive vehicle in which the front driveline is offset to the right.
Figure 2:
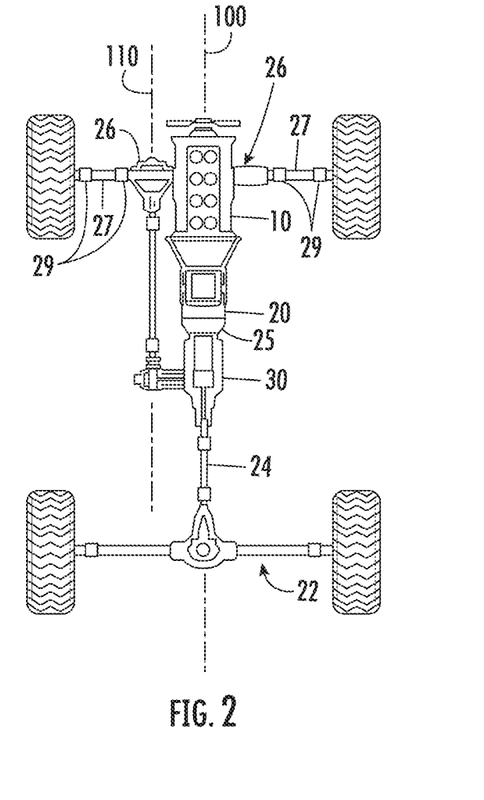
FIG. 2 illustrates a drivetrain layout in a four-wheel drive vehicle in which the front driveline is offset to the left.
Figure 3:
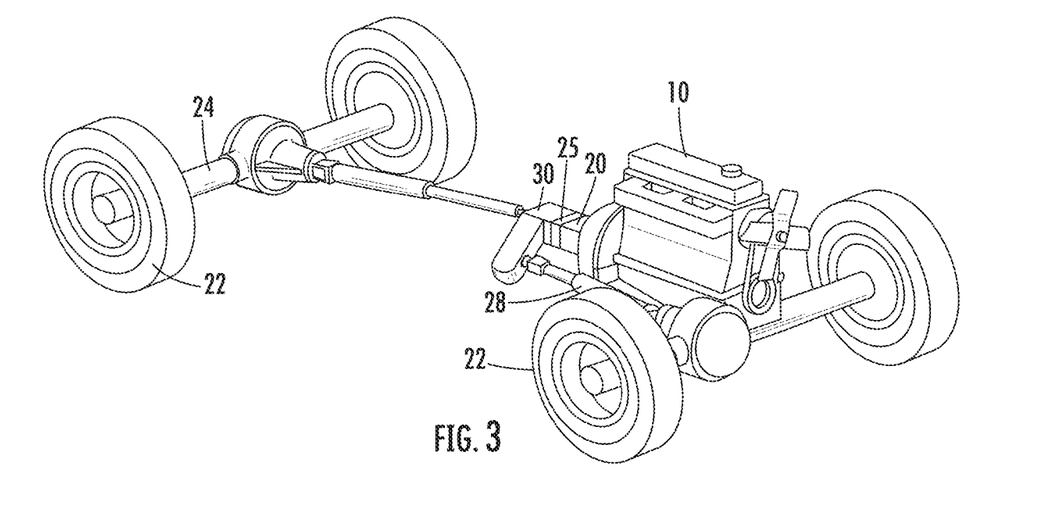
FIG. 3 is a side elevation illustration of a drivetrain layout in a four-wheel drive vehicle.
Figure 4:
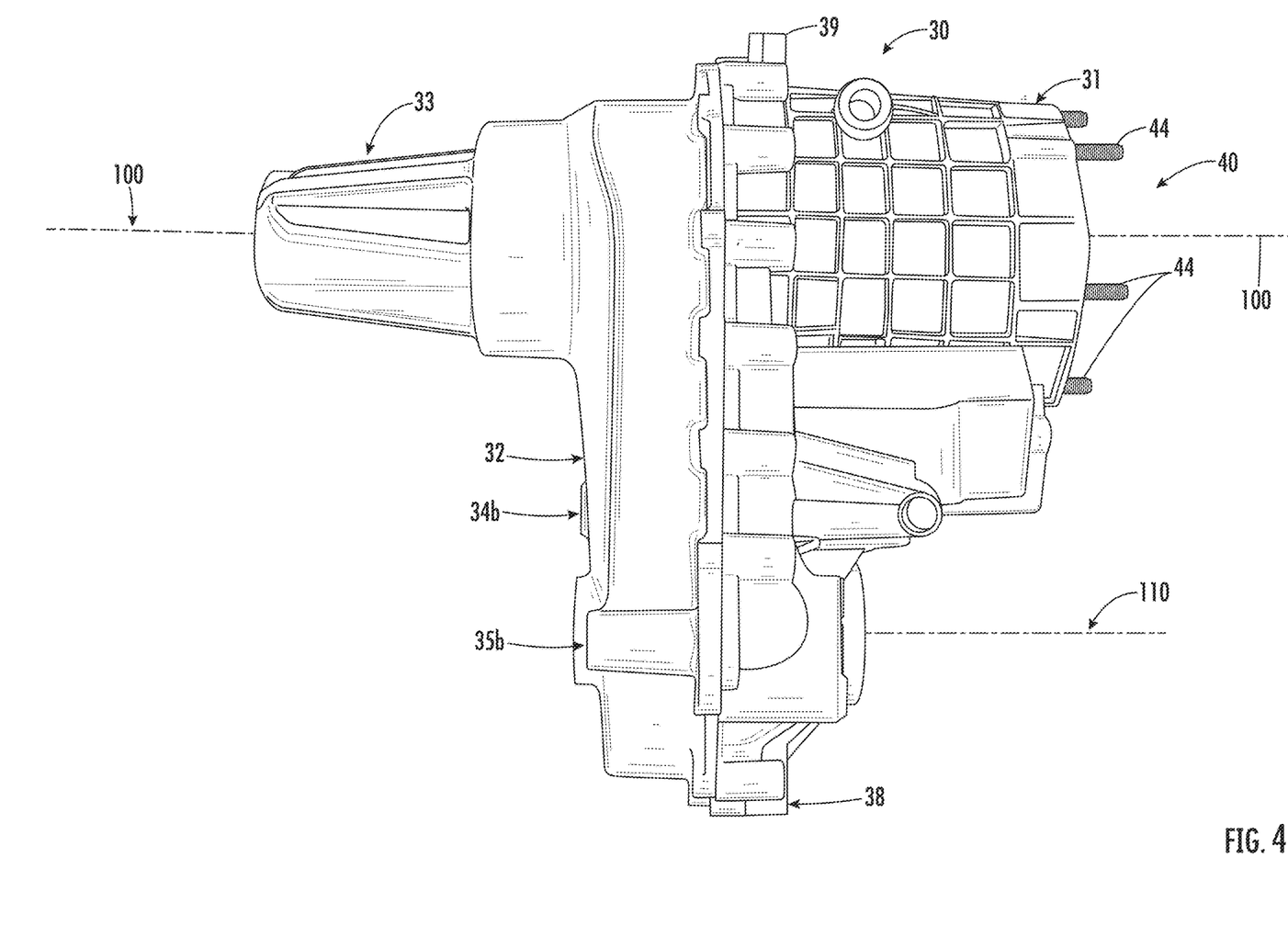
FIG. 4 is a plan view of a universal transfer case oriented for use in right-side offset front driveline.
Figure 5:
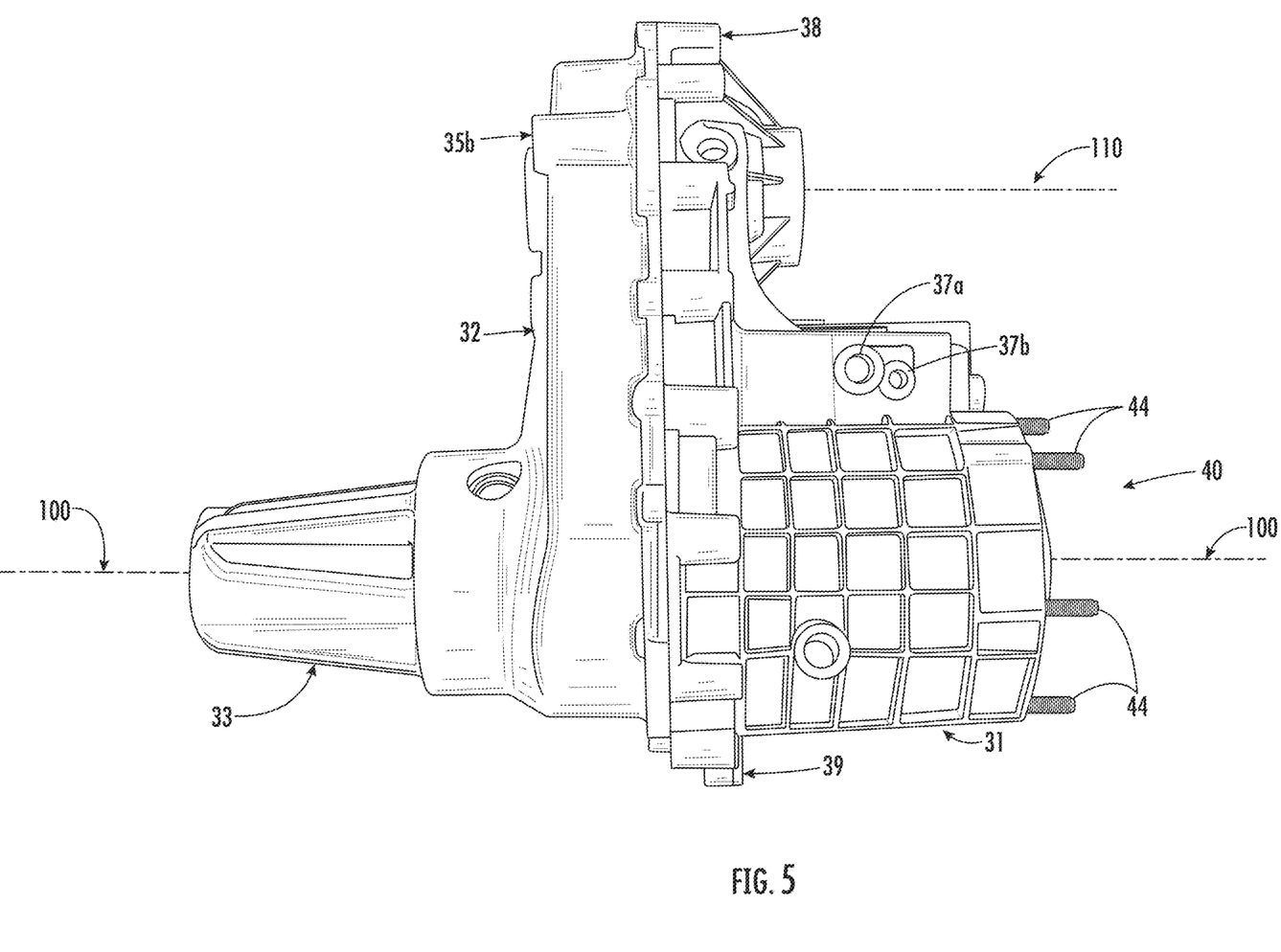
FIG. 5 is a plan view of the universal transfer case re-oriented for use in a left-side offset front driveline.
Figure 6:
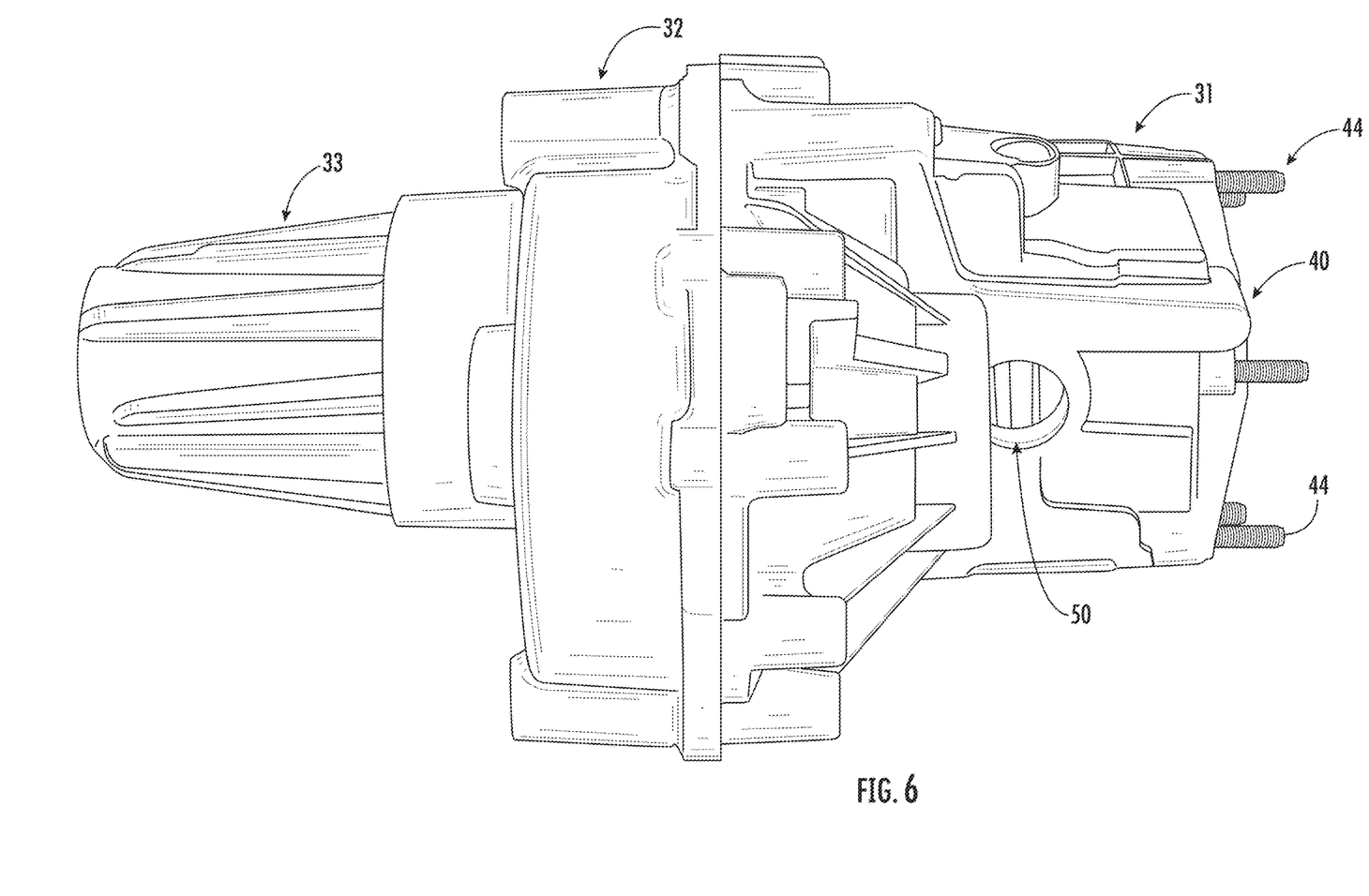
FIG. 6 is an elevation view of the universal transfer case illustrated in FIG. 4.
Figure 7:
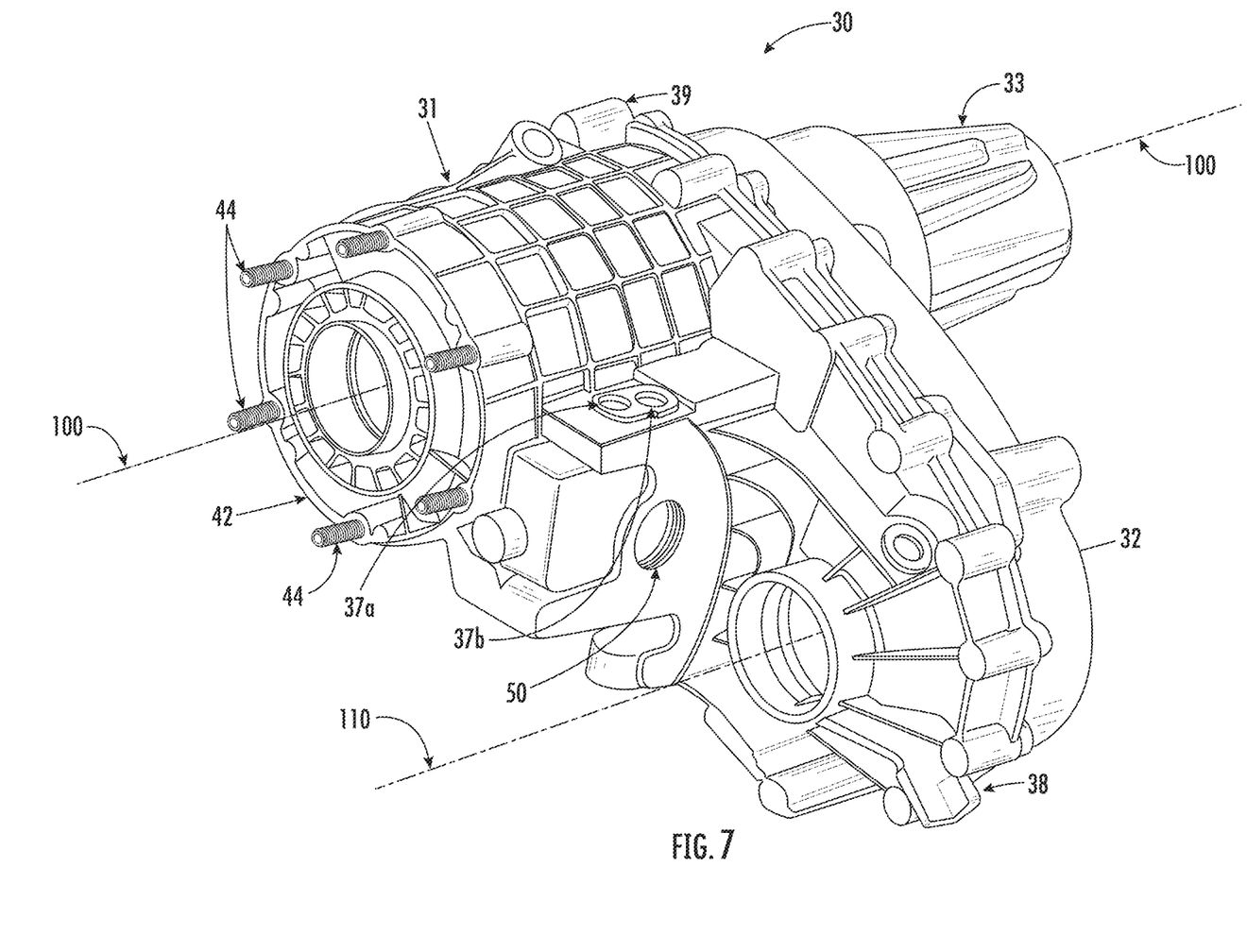
FIG. 7 is a front perspective view of a universal transfer case.
Figure 8:
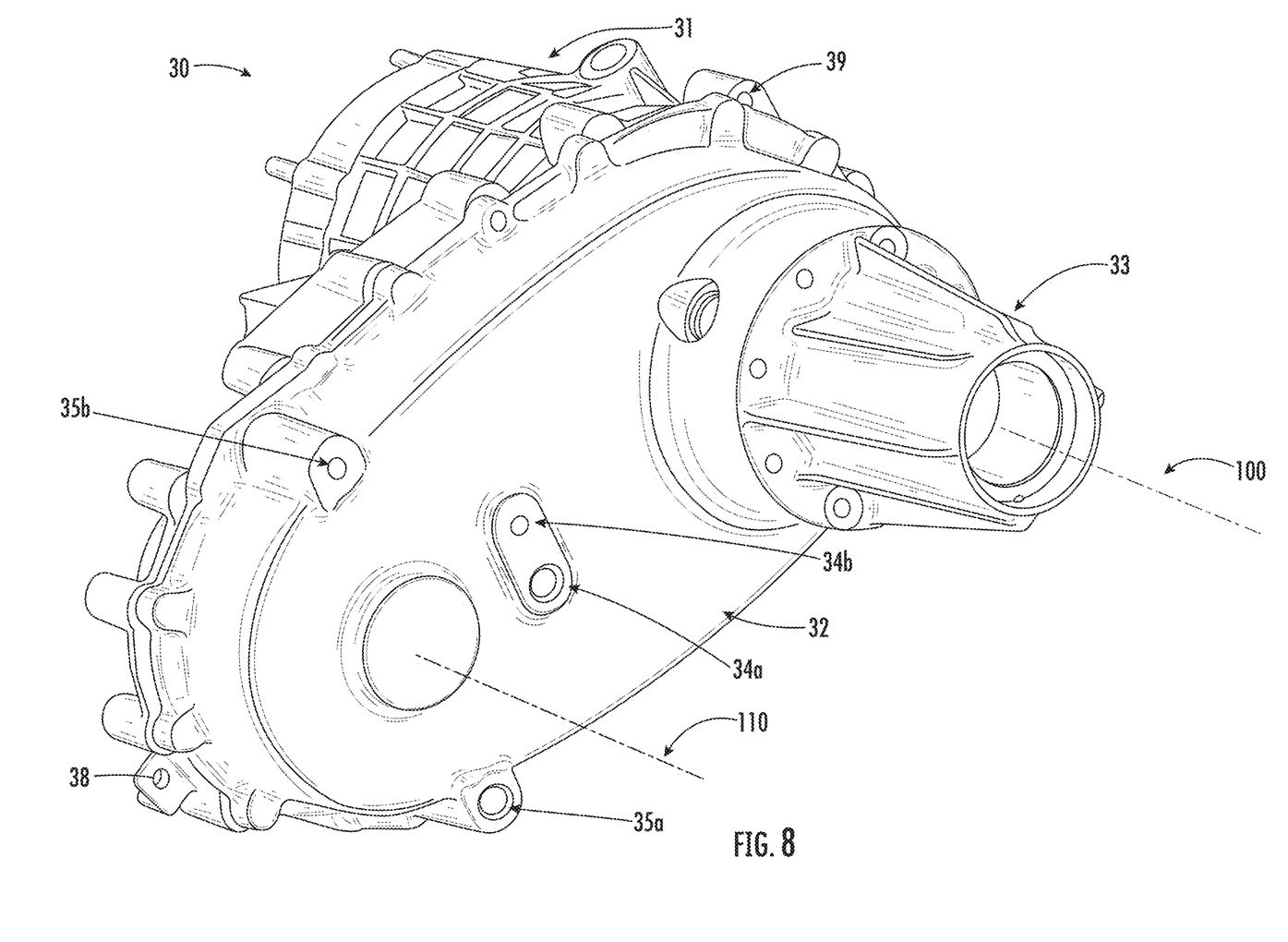
FIG. 8 is a second perspective view of the universal transfer case of FIG. 7.

Referring to FIGS. 1 through 3, diagrams of traditional drivetrain layouts illustrate laterally offset front drive mechanism. There is shown a powertrain 10 longitudinally oriented in a vehicle and defining a primary axis 100. A transmission 20 is coupled to the powertrain 10 and a transfer case assembly 30 is coupled to the transmission via mechanical adapter connector 25. The transfer case assembly 30 splits drive torque from the transmission 20 between a rear drive axle 22 and a front drive axle 26. Drive torque is delivered to the rear axle 22 through rear driveshaft 24; drive torque is delivered to the front axle 26 through front driveshaft 28. The preferred alignment of the transmission and transfer case input is in line with the powertrain axis, primary axis 100 as illustrated. Spatial demands for locating the front driveshaft requires offsetting the front driveshaft from the primary axis to a secondary axis 110. Normal limitations on vehicle ground clearance and space available for the drivetrain dictate that the offset be primarily lateral, though some vertical drop may also be desirable to reduce front driveshaft angle.

Front axles may be solid axles in which a unitary structure laterally spans between the front wheels. The outboard ends of the axle include connections to allow the front wheels to be steered, but the axle assembly is a structural beam spanning between the wheels and the vehicle in turn is supported on the axle. Front axles may also be adapted for use with independent suspensions in which the front axle structure is separated vehicle suspension. A portion of the front drive axle 26 is attached to the vehicle and axle shafts 27, sometimes referred to as half-shafts, extend between the axle structure to wheel hubs. The half-shafts 27 include flexible joints 29 to allow the axle shafts to deflect from the drive axis established by the differential. The flexible joints 29 also allow the front wheels to be steered. The flexible joints 29 may be universal joints, constant-velocity joints, or other functionally equivalent mechanism enabling deflection of the half shaft from the drive axis.

The terms all-wheel drive and four-wheel drive describe power transmission systems for vehicles. All-wheel drive generally describes systems in which power is directed to drive wheels at all times while four-wheel drive systems normally provide power to the drive wheels on typically the rear axle(s), and power all drive wheels, including a front axle, only when selected. Four-wheel drive systems also commonly include reduction gears to provide additional low speed gearing options for the vehicle. The present invention is primarily directed toward four-wheel drive systems but offers utility in all-wheel drive systems as well. Accordingly, the terms all-wheel drive and four-wheel drive are used synonymously herein to describe a transmission system for delivering power to more than one drive axle simultaneously.

Referring to FIG. 4 through 8, an embodiment of a universal powertrain component, specifically a transfer case assembly 30, is illustrated. Universal transfer case assembly 30 comprises a front housing 31, a rear housing 32, and a tail shaft housing 33. The tail shaft housing 33 may be integral with the rear housing 32 in some transfer case designs. The housings are joined by conventional means to create an internal space in which is located necessary gears and power take-off components to direct torque to the front and rear axles. Interfaces between the mating housing portions may include sealing means to contain lubricant for the drive components and to isolate the internals from external contamination. Separating the housing parts provides easy access to the transfer case interior for assembly or maintenance.

The connection 40 between the transfer case and the transmission is a mechanical adapter connector 25 structurally joining the transfer case to the transmission. The transfer case may be entirely supported by the connection to the transmission or a support connection between the vehicle and the mechanical adapter connector may be provided. The adapter connector 25 facilitates the drivetrain connection replacing the tail shaft structure typically transitioning the transmission to a drive shaft powering a rear axle. The transfer case connection to the transmission or adapter is traditionally accomplished by a flanged connection. A flange structure 42 is configured to matingly inferface with a matching flange provided on the transmission or the mechanical connector adapter 25 and may incorporate a combination of threaded fasteners 44 simultaneously engaging the respective flange structures. Threaded studs may be provided on one flange and a plurality of holes provided on the opposing flange through which the studs extend. Threaded openings may be provided and engaged by threaded capscrews to clamp the flanges together. The spacing and arrangement of the fasteners may be established by the transmission manufacturer. The connection configuration may vary between different transmission manufacturers and even among different transmission models from the same manufacturer.

In an embodiment, a plurality of fasteners 44 is radially disposed about the primary axis 100. The plurality of fasteners may be symmetrically arranged about the primary axis 100 and regularly spaced. A regular, symmetric arrangement permits the transfer case to be rotationally "clocked" to vary the location of the secondary axis in relation to the primary axis. In the illustrated embodiment, the range of clocking enables the secondary axis to be positioned laterally to the left or right of the primary axis. Additional clocking alignments may allow the position of the secondary axis to be vertically as well as laterally offset in relation to the primary axis (drive centerline).

The housings may include access port locations, such as oil fill port locations 34a, 34b and oil drain port locations 35a, 35b, which may be selectively machined to provide an opening into the housing interior, such as to allow the addition or removal of lubricant from the transfer case. Access port locations may be made functional by a machining operation, such as drilling and tapping an opening through the housing, in the location best suited for the installed transfer case orientation. In the embodiment illustrated in FIG. 8, oil fill port 34a and oil drain port 35a have been machined for use while port locations 34b and 35b remain unmachined. The alternate locations may remain unmachined (non-functional) to reduce the number of openings in the housing. A machined, functional access port may then be sealed with a threaded plug to contain lubricant within the housing. The selection of the access port location may be made dependent upon the planned installed orientation of the transfer case. In this way the access ports may be ideally positioned, and the alternative locations remain unmachined to reduce the number of openings in the housing.

The housing may include interface locations 37a, 37b to allow installation of sensors in the transfer case and provide a vent penetration into the casing. Interface locations 37a, 37b may be made functional by a machining operation to the housing. The functional interface location may be adapted to receive the required interface component, such as a sensor conductor and a vent. The alternate location may remain unmachined (non-functional) to reduce the required machining of the housing.

The transfer case housings 31, 32 may incorporate additional mounting locations 38, 39 for connecting other external components or appurtenances to the transfer case. Additional mounting locations may be provided in the casing castings and remain unmachined if a particular mounting location is not required for the planned installation. The additional mounting locations may also be arranged on the casing to provide potential mounting locations dependent upon the installed orientation of the transfer case.

The transfer case may include an actuator interface 50 to enable a user to select different operational modes of the transfer case. It is common for transfer cases to include provisions to selectively connect or disconnect the front axle driveline from the primary drive (commonly referred to as selecting two-wheel drive or four-wheel drive). Many transfer cases include a planetary reduction gearset allowing for lower speed, higher torque multiplication operation. Selection means may be provided to allow a user to select whether to engage or disengage the front driveline and to select between high (normal) range operation and low range operation. The actuator may rely on electrical servos to operate the transfer case. The actuator may be by a manually operated shift lever connected by a linkage to the transfer case. The transfer case includes an actuator interface connection 50 to connect external actuator means to the internal mechanisms effecting changes in operational modes. The location of the interface connection 50 on the transfer case exterior and the relative position to internal components defines a preferred location on the housing. Provisions for alternate may be provided, but the preferred approach is to provide a linkage between a transfer case shift lever located in the vehicle and the interface connection wherever it is positioned in the installation.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A method of installing a universal drivetrain component into a vehicle drivetrain powering a first axle and a second axle comprising the steps of:

identifying a first drive axis in relation to the first axle;

identifying a second drive axis in relation to the second axle;

determining an orientation of an offset of the second drive axis in relation to the first drive axis for the vehicle;

providing a universal drivetrain component having a casing, a primary drive axis, a secondary drive axis, and a connector for coupling the casing to the vehicle;

providing a first interface location positioned on the casing for function in the first orientation of the powertrain component;

providing a second interface location being positioned on the casing for function in the second orientation of the powertrain component;

performing a machining operation to make functional the first interface location or the second interface location dependent upon the determined offset of the second drive axis from the first drive axis for the vehicle;

to position the secondary drive axis in one of a the first orientation or the second orientation in relation to the primary drive axis;

orienting the universal drivetrain component to position the secondary drive axis proximate to the second drive axis; and connecting the universal drivetrain component to the vehicle.

2. The method of claim 1, further comprising the steps of:

selecting the first or the second interface location to be made functional dependent upon the orientation of the universal drivetrain component.

3. The method of claim 2, wherein the machining operation includes creating an opening in the casing.

4. The method of claim 3, wherein a function of the first interface location is an oil fill port when in the first orientation, and a function of the second interface location is an oil fill port when in the second orientation.

5. The method of claim 3, wherein a function of the first interface location is an oil drain port when in the first orientation, and a function of the second interface location is an oil fill port when in the second orientation.

* * * * *